United States Patent [19]

Shaffer et al.

[11] Patent Number: 4,671,744
[45] Date of Patent: Jun. 9, 1987

[54] SELF-CONTAINED PROPELLANT DRIVEN TURBOFAN

[75] Inventors: Donald E. Shaffer, North East, Md.; Stanley A. Racik, Newark, Del.; Peter H. Lucas, Newark, Del.; Calvin W. Vriesen, Newark, Del.

[73] Assignee: Morton Thiokol Inc., Chicago, Ill.

[21] Appl. No.: 701,450

[22] Filed: Feb. 13, 1985

Related U.S. Application Data

[63] Continuation of Ser. No. 300,837, Sep. 10, 1981, abandoned.

[51] Int. Cl.4 .................... F04B 17/00; F04B 35/00; F02C 3/26
[52] U.S. Cl. ................... 417/381; 60/39.47; 417/407; 417/409
[58] Field of Search ............... 60/39.47; 417/191, 355, 417/381, 409, 407; 280/736, 738, 741, 742; 441/98, 99; 244/DIG. 2; 52/2; 182/48; 193/258; 102/202, 204, 530, 531

[56] References Cited

U.S. PATENT DOCUMENTS

| | | | |
|---|---|---|---|
| 2,842,937 | 7/1958 | Clark | 60/39.823 |
| 2,942,415 | 6/1960 | Bayard | 60/39.47 |
| 3,073,114 | 1/1963 | Wood | 60/39.47 |
| 3,077,736 | 2/1963 | Feeley, Jr. | 60/39.47 |
| 3,101,590 | 8/1963 | Hagerty | 60/39.823 |
| 3,149,462 | 9/1964 | Lamkin | 60/39.47 |
| 3,180,088 | 4/1965 | Swain | 60/39.47 |
| 3,266,251 | 8/1966 | Kacek | 60/39.47 |
| 3,558,285 | 1/1971 | Ciccone et al. | 60/39.823 |
| 3,771,913 | 11/1973 | MacPherson et al. | 417/191 |
| 3,840,057 | 10/1974 | Lesh, Jr. | 193/25 B |
| 4,008,983 | 2/1977 | Flatt et al. | 417/348 |
| 4,043,572 | 8/1977 | Hattori et al. | 280/738 |

Primary Examiner—Louis J. Casaregola
Assistant Examiner—Timothy S. Thorpe
Attorney, Agent, or Firm—Gerald K. White

[57] ABSTRACT

An integral turbofan/solid propellant gas generator air induction system features in a single device a solid propellant gas generator and a turbofan which are operative, when activated, even after long periods of storage, to take ambient air and compress it to the pressures required in emergency situations for preventing loss of life and valuable equipment, for example, the inflation of an aircraft slide.

15 Claims, 6 Drawing Figures

SELF-CONTAINED PROPELLANT DRIVEN TURBOFAN

This application is a continuation of application Ser. No. 300,837, filed Sept. 10, 1981, now abandoned.

BACKGROUND OF THE INVENTION

1. Field of the Invention

The present invention relates to portable devices which, when activated, deliver ambient air in a compressed state, notwithstanding long periods of storage, for purposes of inflation and mechanical work, which devices are particularly useful in emergency situations for preventing loss of life and valuable equipment.

2. Brief Description of the Prior Art

Portable devices and systems are known in the prior art that are operable in emergency situations after long periods of storage for the inflation of aircraft escape slides, flotation bags, rafts and the like, and for mechanically cutting through vehicle bodies, fuselages and bulkheads. A common requirement of such devices is a capability for producing substantial amounts of power for relatively short periods of time. Portability of such devices, including the power source, is important inasmuch as it is impracticable in emergency situations to depend upon electrical outlets or internal combustion engine fuel as the source of the power.

Devices and systems currently in use for inflating structures such as aircraft escape slides, meet the foregoing requirements in respect of a "self-contained" power source by storing gases under high pressure in pressure vessels and utilizing them in emergency situations to actuate aspirators or turbofans. Inasmuch as the gases are stored over long periods of time, the pressure vessel must be hydrostatically pressure checked periodically, as required by the U.S. Department of Transportation, to determine if the pressure vessel contains enough gas to successfully operate an aspirator or turbofan.

It has been proposed in the prior art to provide the required self-contained power source in escape slide inflation installations in the form of a solid gas producing propellant, such as a rocket propellant. Such a power source is described in a paper by R. J. Richards published in SAFE ENGINEERING. August/September, 1970. A similar power source is described in U.S. Pat. No. 3,640,083, Galbraith et al.

The Richards paper describes a solid propellant "cool gas" generator for the direct inflation by the generated gas of aircraft emergency escape slides rafts, pontoons, and flotation bags. The inflation is through long lengths of tubing or hoses that are provided for the purpose of cooling the gas which, as generated is very hot, to a temperature that is compatible with the elastomers or fabrics used in the inflatable structure. The paper further describes such a generator used with a mixing chamber. aspirator, check valve. a nozzle and an auxiliary coolant such as a fluorinated and/or chlorinated hydrocarbon refrigerant for cooling the gases prior to delivering them through a hose connection to the inflatable structure. Depending upon aspirator efficiency the gases are stated to be delivered to the inflatable structure within 2 to 10 seconds, a volume output of 200 to 400 cu. ft. at pressures ranging from 1.5 to 3.0 psig. being developed. The weight of the generator is stated as ranging from 10 to 30 pounds including hoses and aspirators, the generator being 20 inches long with an outside diameter of 5 inches.

U.S. Pat. No. 3,640,083 discloses a solid propellant cool gas generator for inflating an aircraft escape slide in which a portion of the generated hot gases pressure feed as liquid from a storage chamber into a mixing zone for mixing with the liquid and causing vaporization, the liquid being a liquified fluorinated hydrocarbon type refrigerant, liquified carbon dioxide. liquified air, liquified ammonia, aqueous ammonia, water alone or a mixture of these listed materials. The vaporization of the liquid is stated to be attended by cooling of the hot gases. The relatively cool gases are conducted by a conduit to the structure to be inflated. Use of the gases for turbine operation also is mentioned.

There are problems in the application of such solid propellant cool gas generators for inflating inflatable structures. In terms of weight and volume of gas produced, the generators are inefficient whereby the volume of gas produced at a useful temperature and pressure is limited. Nitrogen/carbon dioxide mixtures that are used in inflation systems currently in use create significant operational problems because of the properties of carbon dioxide at low temperature, that is to say, its tendency to remain a liquid. This tendency results in a slow release of gas which results in unsatisfactory aspirator performance. Additionally, there is a tendency for the hoses to "kink" if not properly maintained thereby interfering with the proper operation of the system.

Devices utilizing gas producing propellants as a self-contained power source for mechanical cutting or other work-effecting purposes have been proposed in the prior art. Thus, U.S. Pat. No. 3,235,041, Schlidt et al discloses a portable power cutter wherein a turbine wheel is driven by the hot gases that are produced by a solid propellant gas generator. The turbine wheel is connected to effect driven rotation of a cutting tool shaft through a motion transmitting mechanism including a speed regulating assembly and speed reduction gears. The size of the cutter is described as being 34 inches long and $5\frac{1}{2}$ inches in diameter the weight without the cutting tool being 25 pounds. The cutter is said to be useful for cutting through metallic fuselages, body sections and bulkheads that present severe access problems in emergency situations.

U.S. Pat. No. 2,578,443, Nardone, discloses a fuel supply system that is mounted on a rocket motor and includes a solid propellant gas generator for driving a turbine wheel. The turbine wheel is connected through speed reduction gears to drive the shaft of a fuel pump which pumps liquid fuel from a tank to the combustion chamber of the rocket motor.

Because the turbine wheel turns many times faster than the driven shaft in the devices of each of the Schlidt et al and Nardone patents, the gear reduction is essential. This necessarily adds to the complexity, increases the weight, and reduces the efficiency of the device, and in the case particularly, of the Schlidt et al patent, detracts from its portability.

U.S. Pat. No. 3,417,566, Gould, discloses a portable tool for rotating a shaft to drive other tools and comprises a disposable fuel cartridge that produces heat through burning for generating steam in a boiler system. The steam is used to drive a piston swash plate type engine for rotating the shaft. Such a portable tool also is characterized by its complexity and inefficiency.

SUMMARY OF THE INVENTION

Among the objects of the invention is to provide an efficient and economical system that overcomes the aforementioned problems of the prior art and that is operable, when activated, even after long periods of storage, for delivering a compressed ingested gas such as ambient air, nitrogen, etc. to pressurize an inflatable structure, to start a mechanical piece of machinery, or to drive, rotate or move a fluid, gas or solid material by use of such machinery.

Another object of the invention is to provide an improvement in such systems that results in greater efficiency in terms of weight and volume of the components making up the system.

A more specific object of the invention to provide an integral turbofan and solid propellant gas generator or air induction system for delivering ambient air in a compressed state for purposes of inflating of inflatable structures, and for effecting mechanical work.

A further specific object of the invention is to provide such an integral turbofan/gas generator or air induction system wherein the solid propellant exhaust gases, after passing through the turbine, are cooled by aspirating ambient air into the exhaust gases and are then "dumped overboard," that is, expelled to the atmosphere.

Still another object of the invention is to provide in such an air induction system an inherent safety feature involving the generation of low toxicity gases, a feature having particular utility where the propellant of necessity is stored in populated areas such as in aircraft.

In accomplishing the foregoing and other objectives of the invention, there is coupled, in a single device or system, a solid propellant gas generator and a turbofan for the most efficient use of each separate component. The generated hot solid propellant gases drive the turbine which is mounted on a single shaft with a fan or a series of staged fans. These fans take ambient air and compress the air to the pressures required for the application. In the case of inflatable structures such as aircraft slides and rafts, the sizing of the ambient air induction system determines how much inflation air is delivered. Various relief and safety devices are built into the system to ensure safe operation in use.

Significant attributes of the integral turbofan/solid propellant gas generator system of the present invention, as compared with currently used systems of the prior art, are:

1. No storage of high pressure gases.
2. No requirement for checking pressure before use.
3. No periodic hydrostatic pressure tests of the pressure vessel.
4. Long service life.
5. Minimal maintenance.
6. The inflation gas is primarily ambient air thereby minimizing any tendency to depressurization or over pressurization of the inflatable structure.
7. Up to 80% weight savings over currently used systems.
8. Up to 70% volume savings over currently used systems.

BRIEF DESCRIPTION OF THE DRAWINGS

In the following detailed description of the invention, reference is made to the accompanying drawings which form a part hereof. Like numerals refer to like parts in all views of the drawings and throughout the description. In the drawings.

DESCRIPTION OF THE PREFERRED EMBODIMENT

Figure 1:
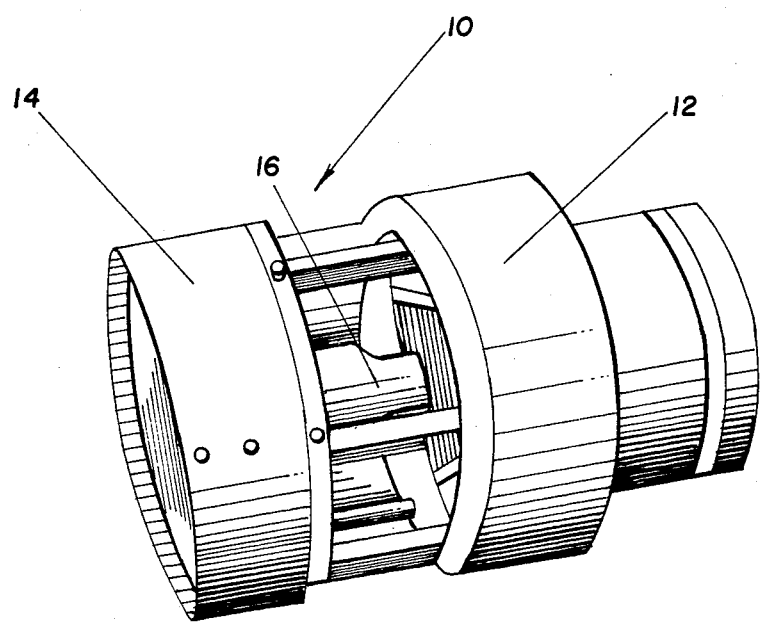
FIG. 1 is a perspective view of an integral turbofan/solid propellant gas generator or air induction system according to a first embodiment of the invention.

Referring to the drawings the integral turbofan/solid propellant gas generator air induction system according to the first embodiment of the invention, as illustrated, in FIGS. 1–5, is indicated generally by a reference numeral 10 and includes a turbofan assembly 12 and a gas generator assembly 14.

The turbofan assembly 12 comprises a generally conically shaped mounting member 16, a turbine wheel 18, an air compressor fan or pump 20, and a fan housing 22 of cylindrical form. At a central position mounting member 16 carries a turbine shaft bearing 24 within which a turbine shaft 26 is supported for rotation. One end of shaft 26 is keyed to the turbine wheel 18, the other end of shaft 26 being fixedly attached to the hub 28 of fan 20. The turbine wheel 18 and compressor fan 20 are in this manner directly coupled and supported for rotation through the shaft 26 and bearing 24. Therefore, when the turbine wheel 18 is driven for rotation, the compressor fan 20 is directly driven at the same rate of rotational speed.

Figure 2:
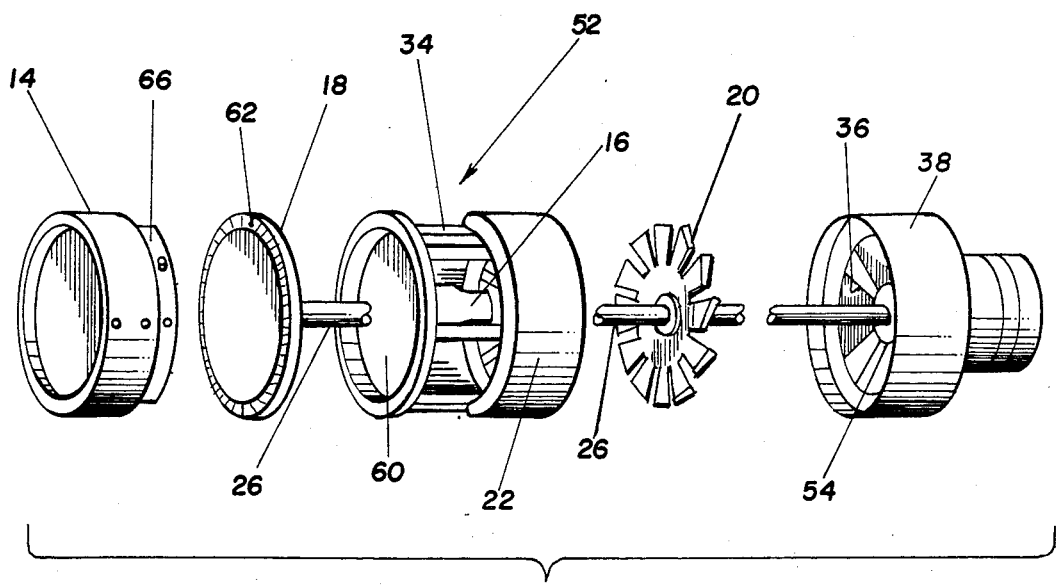
FIG. 2 is an exploded perspective view of the air induction system of FIG. 1.
Figure 3:
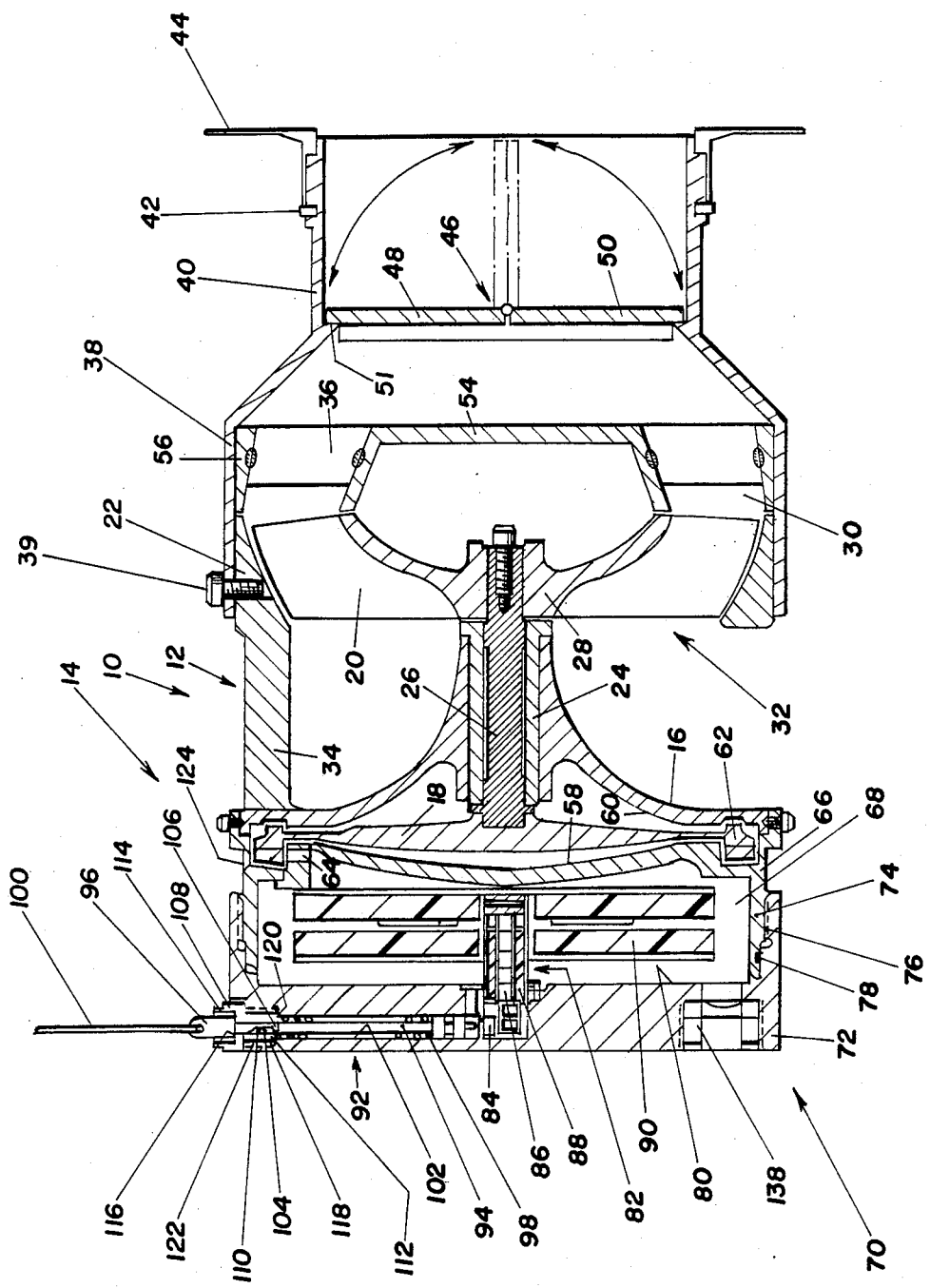
FIG. 3 is a fragmented longitudinal cross sectional view of the air induction system of FIG. 1 taken on a plane that contains the longitudinal axis thereof and illustrates the manner of attachment of the air induction system to a structure to be inflated.

The turbofan assembly 12 further comprises a generally toroidal air induction duct indicated at 30 having an air inlet 32 and including radially disposed sets of straightening vanes 34 and 36, and a cylindrical outer housing 38 which is disposed in surrounding relation to fan housing 22. In FIG. 3, in order to avoid complication of the drawing, one only of the straightening vanes 34 is shown. There desirably are several such straightening vanes 34 as is seen in FIGS. 1 and 2.

Housing 38 is fixedly attached to housing 22 as by suitable screws 39 and includes a duct portion 40 of reduced diameter that is attached in a sealing manner to a circular inlet opening 42 of an inflatable structure a portion 44 only of which is shown in FIG. 3. Contained within duct portion 40 is a sealing valve that is indicated generally at 46 and which includes semicircular cooperating flappers 48 and 50. In FIG. 3, flappers 48 and 50 are shown in the closed position of valve 46, each in abutting relation with a shoulder 51 that is provided internally of duct portion 40, the flappers 48 and 50 being pivotable along their adjacent diameters in any suitable manner to the inner wall of duct portion 40. In the open position of valve 46, flappers 48 and 50 are disposed substantially parallel to each other, in abutting relation.

In the embodiment of the invention illustrated in FIGS. 1–5, the mounting member 16, fan housing 22 and straightening vanes 34 desirably may be formed as a single or unitary member 52. This is best seen in the exploded perspective view of FIG. 2. Also, as shown in FIG. 3, the straightening vanes 36 are supported within outer housing 38 between the peripheral outer surface of a generally cup shaped member 54 and the inner surface of a generally cylindrical member 56, each of the vanes 36 being welded, for example, at one edge to the member 54 and at an opposite edge to member 56. The outer surface of cylindrical member 56 is disposed in close sealing relation to the inner cylindrical surface of outer housing 38.

The turbine wheel 18 is positioned in a chamber formed between a circular dished wall 58 of the gas generator assembly 14 and an adjacent inwardly formed wall 60 of the mounting member 16. As best seen in FIG. 2, the turbine wheel 18 has its outer peripheral portion formed with a plurality of circumferentially spaced turbine wheel blades or teeth 62. The blades 62 are of conventional dynamic design and are arranged in a manner to be described to receive gases from a plurality of circumferentially spaced, generally radially extending nozzles 64 that are provided in a nozzle ring or block 66 that is formed at the periphery of circular wall 58. Nozzles 64 provide communication between the turbine wheel 18 and a combustion chamber 68 that is provided in the gas generating assembly 14.

The gas generator assembly 14, as shown in FIG. 3, further includes a housing 70 comprising an outer half shell 72 and an inner half shell 74. The half shells 72 and 74 form combustion chamber 68 and are provided with cooperating screw threads 76 for engagement of and locking of the half shells together. As shown, dished wall 58 and nozzle block 66 comprise integral portions of the inner half shell 74. Desirably, an O-ring 78 is provided in cooperation with the screw threads 76 for sealing chamber 68 against dirt and moisture. Further sealing of the screw threads 76 against tampering may also be provided, if desired.

Positioned in combustion chamber 68 in coaxial relationship therewith and supported internally by the circular wall 80 of the outer half shell 72 is an ignition train 82 comprising a percussion cap 84, boron potassium nitrate (BKNO$_3$) pellets 86, and small strips 88 of solid propellant that are disposed in surrounding relationship with respect to pellets 86. Surrounding the ignition train 82 within combustion chamber 68 is main solid propellant grain 90.

For activating the percussion cap 84 is a firing pin assembly 92 including a firing pin 94, a pull pin 96, a helical spring 98, and a lanyard 100. Adjacent ends of firing pin 94 and pull pin 96 are provided with cooperating curved or S-shaped surfaces 104 and 106, respectively, that serve to hold the pins 94 and 96 in engagement even though pulled in opposite directions when they are aligned, as shown, within a bore. Firing pin 94, with spring 98 surrounding it, is positioned within a radial bore 102 that is provided in the wall 80 of half shell 72.

Firing pin assembly 92 further includes a bushing 108 for facilitating cocking of the firing pin assembly 92. Bushing 108 includes a bore 110 of diameter sufficient to allow passage of firing pin 94 but not spring 98 thereby providing a step bearing surface 112 for spring 98. A counterbore 114 in bushing 108 provides a step bearing surface 116 for the pull pin 96. Bore 102 is counterbored at 118 adjacent the periphery of the half shell 72 to provide a step bearing surface 120 for bushing 108. Cooperating screw threads 122 are provided in counterbore 118 and on bushing 108 for engagement of and holding bushing 108 within counterbore 118 against step bearing surface 120.

In cocking the firing pin assembly 92, the bushing 108 is loosened and the firing pin assembly is withdrawn from bore 102 a distance sufficient to allow the upper end of the firing pin 94, as seen in FIG. 3, to be pushed against the force of spring 98 through the bushing 108. With the end 108 of pull pin 96 in aligned or locking engagement with the end 104 of firing pin 94, the firing pin 94 then is released, allowing the compressed spring 98 to pull the aligned and locked ends 104 and 106 within the bore 110 of bushing 108 until the pull pin 96 engages the step bearing surface 116. The firing pin assembly 92 then is reinserted in bore 102 and the bushing 108 is screwed tightly in counterbore 118.

When pull pin 96 is withdrawn from bushing 108, as with the aid of lanyard 100, the spring 98 is compressed until the firing pin 94 clears the bore 110 in bushing 108 sufficiently to allow the firing pin end 104 to become disengaged from the end 106 of pull pin 96. The disengaged firing pin 94 is then activated to strike the percussion cap 84 due to the stored energy in spring 98.

The percussion cap 84, when struck by the firing pin 94, fires into the boron potassium nitrate pellets 86 which, in turn, fire into the small strips of solid propellant 88. The solid propellant strips 88 fire directly onto the surface of the main propellant grain 90.

Upon ignition of the main propellant grain 90, the generated gas pressurizes the gas generator housing 70 and is vented through nozzles 64 in nozzle block 66. The nozzles 64 accelerate the gases and cause the gases to impinge upon the turbine blades 62 of turbine wheel 18.

After impinging upon the turbine blades 62, the generated gases are exhausted to the atmosphere. Suitable exit ports are provided in the periphery of inner shell 74 of housing 70 for this purpose, one such exit port being indicated at 124 in FIG. 3. Desirably, a plurality of such exit ports 124 are provided in association with the nozzles 64 and turbine blades 62.

The integral turbofan/solid propellant gas generator 10 uses a solid propellant 90 which produces nitrogen gas and is relatively unaffected by storage or operational temperatures. As such, the integral turbofan/gas generator assembly will function from −40° F. to +160° F. with little variation in inflation time.

A safety feature, which involves the use of low cyanide-containing gases, is necessary where the propellant is stored in populated areas such as in aircraft. An example of a propellant which has been developed to meet this requirement is:

|  | Wt. % |
| --- | --- |
| Carboxyl-terminated poly(oxydi-ethylene adipate) + triglycidyl ether of p-amino phenol | 28.75 |
| Cure catalyst (1 chromium octoate/12-ethylhexanoic acid) | 0.07 |
| Thermax | 0.18 |
| 2,4-diamino-6-phenyl-s-triazine | 1.00 |
| N,N'—dihydroxyethane diamide | 70.00 |
| Gas percentages |  |
| Carbon monoxide | 7 |
| Hydrogen cyanide | 0.4 |

It will be understood, however, that other nitrogen gas producing propellants may be employed such as that described in U.S. Pat. No. 4,203,787, Kirchoff et al, and those disclosed in copenidng applications, Ser. No. 221,942, now U.S. Pat. No. 4,369,079, Shaw, and Ser. No. 221,943, now U.S. Pat. No. 4,370,181, Lundstrom et al.

Figure 4:
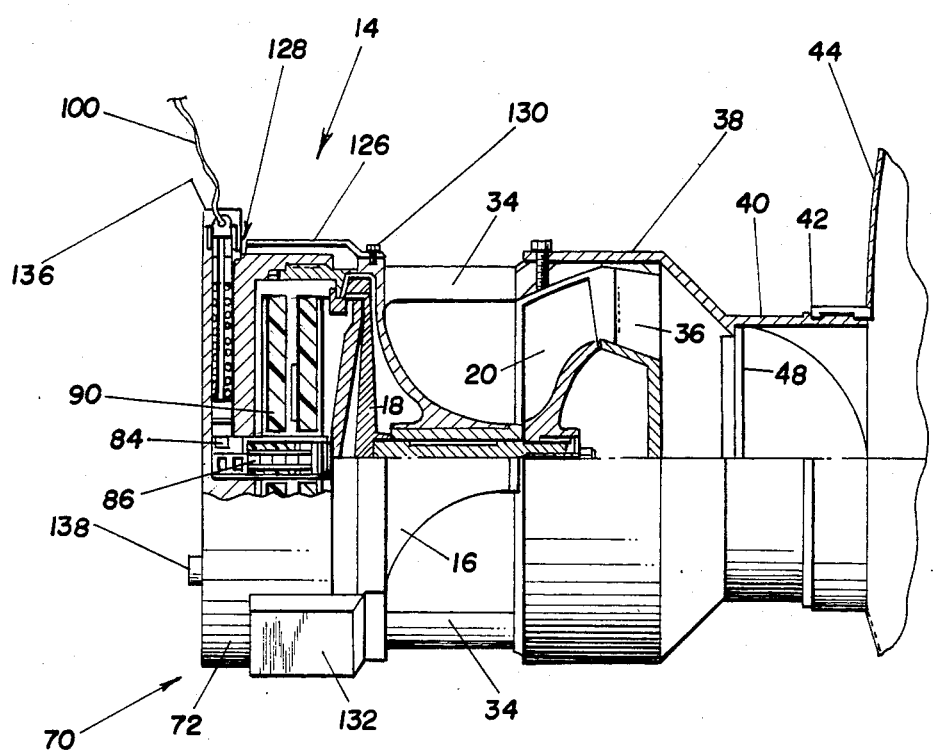
FIGS. 4 and 5 are longitudinal views, partly in section, illustrating modifications of the first embodiment of the invention.

As shown in FIG. 4, a generally cylindrical exhaust duct or deflector shield, as indicated at 126, may be provided for causing the exhaust gases to follow the contour of the gas generator housing 70, and for causing such gases to be expelled aft of the turbofan assembly 12, as through an exit port indicated at 128. Shield 126, as shown, is attached in sealing manner at a region of reduced diameter by screws 130 to the adjacent peripheral section of mounting member 16. Small slots (not shown) may be provided in the periphery of deflector shield 126 to allow ambient air to be entrained in the exhaust gases, thereby to cool the exhaust gases. The cooled exhaust gas/ambient air mixture is expelled to the atmosphere through exit port 128.

For providing additional cooling of the exhaust gases there may be provided, as shown in FIG. 4, a cooling chamber region 132 in association with the deflector shield 126, such cooling chamber incorporating a heat sink or solant (consumable coolant) for cooling the exhaust gases.

Figure 5:
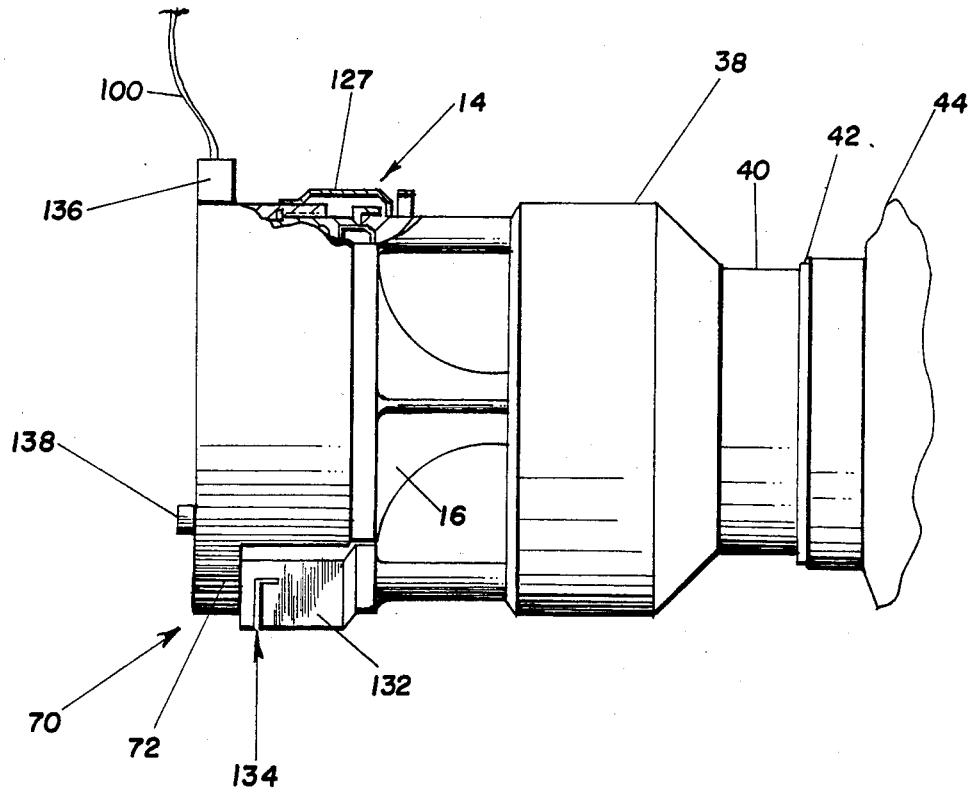

In the modification of FIG. 5, a deflector shield or exhaust duct, designated 127, is shown in a position alternative to the position of deflector shield 126 in FIG. 4. Deflector shield 127, similar to shield 126, is generally cylindrical in form and is provided to cause the exhaust gases to follow the contour of the gas generator housing 70. Shield 127 however, has an area of reduced diameter attached in sealing manner to the periphery of the outer half shell 72 of housing 70, and is arranged to direct the exhaust gases from gas generator assembly 14 to the compressor fan 20. Directing the exhaust gases toward the fan 20 permits the fan 20 to ingest the exhaust gases.

Additionally, there is shown in FIG. 5, an aspirator slot 134 in association with a cooling chamber region 132 that is provided in association with the deflector shield 127 and which desirably includes a heat sink or solant for cooling the exhaust gases. The entrainment of air through aspirator slot 134 provides cooling of the exhaust gases to a safe level.

OPERATION OF THE FIRST EMBODIMENT OF THE INVENTION

The turbine wheel 18 rotates as a result of the exhaust gases impinging upon the turbine blades 62. Since the turbine wheel 18 is directly coupled by way of turbine shaft 26 with the compressor fan 20, the compressor fan 20 rotates, also, a feature of the invention being that since the compressor fan 20 rotates at turbine speed, there is no need for reduction gears.

Rotation of the compressor fan 20 causes ambient air to flow radially inward at air inlet 32, past stationary or static straightening vanes 34, through stationary or static additional straightening vanes or stators 36, and through sealing valve 46 and into the structure to be inflated or pressurized, a portion 44 only of which is shown in the drawing.

When the inflatable structure is sufficiently pressurized or inflated, the gas generator main propellant grain 90, as predetermined, burns out. Power, therefore, ceases to be provided by the compression fan 20. This causes the compressor fan 20 to stall and permits compressed gas within the inflated or pressurized structure to flow out of the inflated structure and back through the compressor fan 20. Such flow of gases causes each of the flappers 48 and 50 in the sealing valve 46 to rotate to a closed position in abutting relation with shoulder 51 of duct position 40, as seen in FIG. 3. This seals the inflated or pressurized structure, and as a result, no additional gases are permitted to leak from the inflated structure.

Once the sealing valve 46 is closed, the function of the integral turbofan/solid propellant gas generator 10 has been completed. In order to refurbish the generator 10, the inflated or pressurized structure is depressurized and the gas generator housing 70 is removed. The residue of the ignition train 82 and main propellant grain 90 is removed from housing 70 and replaced with a new ignition train 82 and propellant grain 90. Desirably, a kit to replace the ignition train 70 and propellant grain 90 may be provided.

For safety, particularly during transport of the integral turbofan/solid propellant gas generator, a firing pin cover, as indicated at 136 in FIGS. 4 and 5, may be provided to guard against the firing pin 94 being fired accidentally. Also, burst discs, as indicated at 138, may be provided in the wall of half shell 72 of gas generator housing 70 such that if the gas generator housing 70 is over-pressurized, the burst discs 138 will burst, thereby protecting the housing 70 and in a manner so as not to cause any net thrust. The burst discs 138 may be of a standard design having four exhaust ports, each of which is spaced 90° apart, whereby any thrust produced is offset by the port 180° away.

Because the gases generated by the generator assembly 14 are used directly to power the turbofan assembly 12, the turbofan/solid propellant gas generator 10 is much more efficient than existing compressed gas or cool (about 400° to 800° F.) gas generator driven aspirators or turbofans. Table I below presents a theoretical comparison of the weight and volume savings of the integral turbofan/solid propellant gas generator 10 of the present invention over existing aircraft slide inflation devices in inflating both narrow body and wide body inflatable structures.

TABLE I

| | PERFORMANCE TRADE-OFF | | | |
|---|---|---|---|---|
| | Narrow Body | | Wide Body | |
| | Current Design | Air Induction System 10 | Current Design | Air Induction System 10 |
| Number of Aspirators, Turbofans, or Air Induction Systems | 2 or 1 | 1 | 2 | 2 or 1 |
| Total Inflation System Volume, In.$^3$ | 480* | 332 | 1248*** | 664 or 332* |
| Total Inflation System | 18 to 20 | 8.1 (Max) | 41 to 60 | 19.8 or 9.9* |

TABLE I-continued

| | PERFORMANCE TRADE-OFF | | | |
|---|---|---|---|---|
| | Narrow Body | | Wide Body | |
| | Current Design | Air Induction System 10 | Current Design | Air Induction System 10 |
| Weight, LB. | | | | |

*If a common fabric manifold were employed, a single air induction system would inflate a 400 ft.³ slide/raft in 8 seconds while working against a 1.9 psig back pressure.
**Estimate based on a 5.32-inch bottle, 18 inches long; a regulator; a 1-inch diameter hose, 36 inches long; and two small aspirators.
***Estimate based on a 6.8-inch bottle, 22 inches long; a regulator; a 1-inch diameter hose, 72 inches long; and two aspirators.

Figure 6:
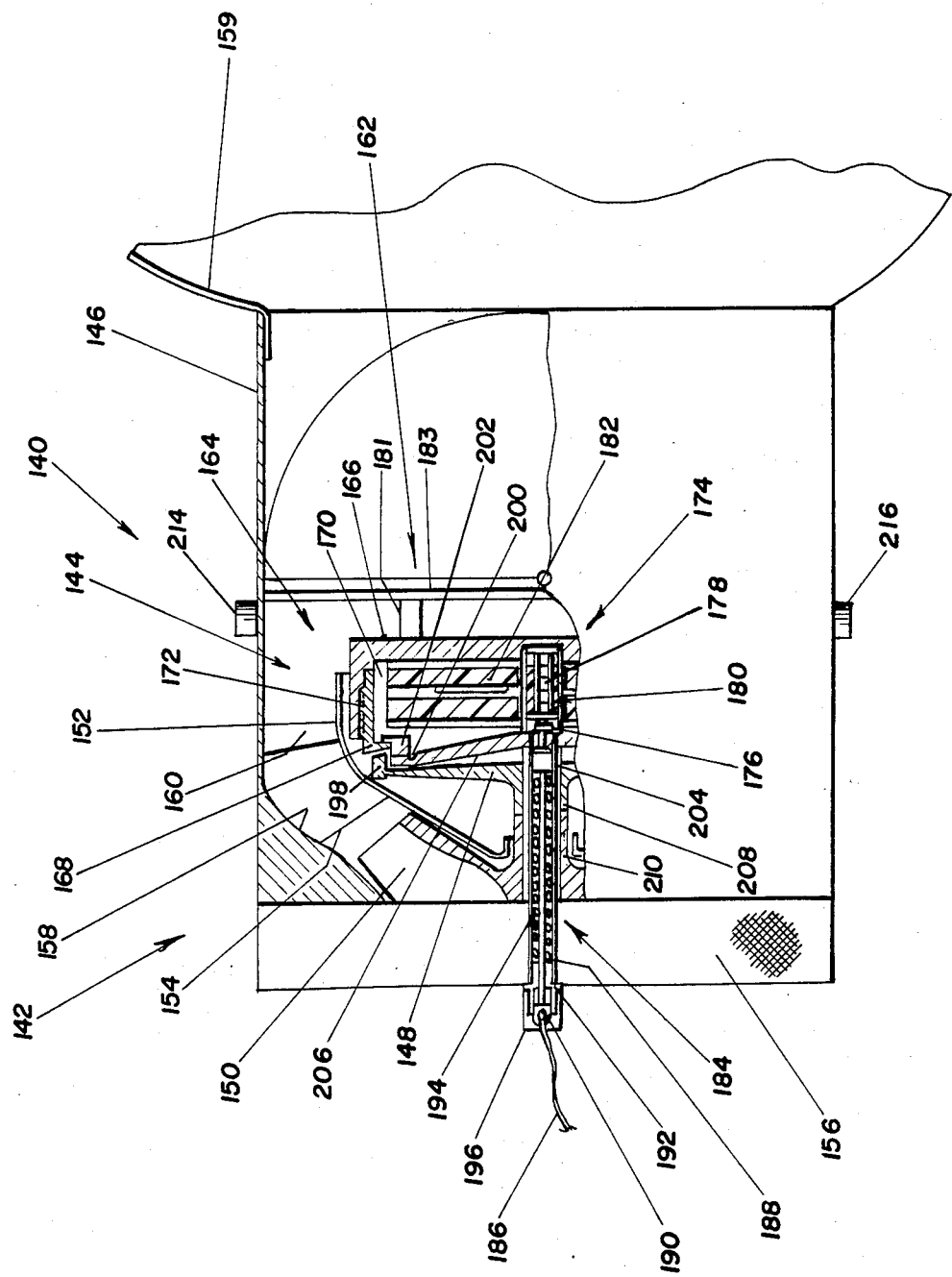
FIG. 6 is a longitudinal view, partly in section, of a second embodiment of the invention.

In FIG. 6 there is illustrated a second embodiment of the invention wherein the attachment points of an integral turbofan/solid propellant gas generator or air induction system 140 are such as to permit the system 140 to be balanced, thereby minimizing the stress loads on the structure to be inflated. Additionally, in this embodiment of the invention the relative positions of the compressor fan and gas generator have been changed, thereby permitting ambient air to enter the compressor fan inlet both radially and longitudinally. This permits the inflatable structure manufacturer to package the inflatable structure around the cylindrical portion of the air induction system. Also, in this invention embodiment, all exhaust products are contained within the inflatable structure thus eliminating or at least minimizing human exposure in populated areas to such products.

As shown in FIG. 6, the integral turbofan/solid propellant gas generator system 140 includes a turbofan assembly 142 and a solid propellant gas generator assembly 144. The turbofan assembly 142 is disposed at one end of system 140 and comprises a cylindrical housing 146, a turbine wheel 148, a compressor fan 150, an internal deflector or exhaust shield 152, a stationary or static straightening vane 154, and a screened air inlet 156. The shield 152 has a convex shape that in conjunction with the concave internal surface 158 of housing 146 provides a toroidal shaped duct 160 for the flow of ambient air that is drawn into inlet 156 by fan 148. Such air flows through duct 160 to an inflatable structure a portion only of which is indicated at 159, such flow being through a sealing valve indicated at 162 having a pair of cooperating flappers that may be similar in structure and operation to the flappers 48 and 50 of sealing valve 46, as illustrated in FIG. 3.

The solid propellant gas generator assembly 144 comprises a housing 164 having an outer half shell 166 and an inner half shell 168. The half shells 166 and 168 form a combustion chamber 170 and are retained in locking engagement by screw threads 172, an O-ring (not shown) being provided for sealing against dirt and moisture.

Positioned coaxially of the screened air inlet 156, fan 150, turbine wheel 148, and generator 144 is an ignition train 174. The ignition train 174 may be substantially identical in construction to the ignition train 82 that is described in connection with FIG. 3 and includes a percussion cap 176, boron potassium nitrate (BKNO₃) pellets 178 and small strips 180 of solid propellant that are disposed in surrounding relationship with respect to pellets 178. Surrounding the ignition train 174 within the combustion chamber is main solid propellant grain 182 which may be identical in composition to the main propellant grain 90.

Outer half shell 166 of gas generator housing 164 is suitably supported within outer housing 146 on studs 181 which are supported on a ring or spider 183 within housing 146.

A firing pin assembly 184 is provided for activating the percussion cap 176. The firing pin assembly 184 may be substantially identical in construction to the firing pin assembly 92 of FIG. 3, and includes a lanyard 186, a firing pin 188, a pull pin 190, a bushing 192, and a spring 194. The firing pin assembly 184 may also include a firing pin cover 196.

Cocking of the firing pin assembly 184 and activation of the percussion cap 176 are substantially the same as for firing pin assembly 92 and percussion cap 84 of FIG. 3, and hence, will not be further described herein except to note that when struck by the firing pin 188, the percussion cap 176 fires into the strips 180 of solid propellant which, in turn, fire directly into the main propellant grain 182.

As shown in FIG. 6, blades 198 of turbine wheel 148 receive gases from circumferentially spaced generally radially extending nozzles 200 that are provided in a ring or block 202 that is formed at the periphery of inner half shell 168 of housing 164. Substantially identical to the structure illustrated in FIG. 3, the nozzles 200 provide communication between the combustion chamber 170 and the turbine wheel 148.

Turbine wheel 148 and compressor fan 150 are both mounted for rotation on a hollow shaft bearing 204 that is fixedly supported in a suitable manner at one end at a central location on a dished wall 206 of the inner half shell 168 of gas generator housing 164. The other end of shaft bearing 204 may also be fixedly supported in any suitable manner at a central location of the screen air inlet 156.

Specifically, turbine wheel 148 is supported on a hollow shaft 208 and compressor fan 150 is supported on a hollow shaft 210, the shaft bearing 204 extending through both of the hollow shafts 208 and 210. Abutting edges of shafts 208 and 210 are fixedly attached to each other whereby, upon rotation of turbine wheel 148, compressor fan 150 is directly rotated thereby.

OPERATION OF THE SECOND EMBODIMENT OF THE INVENTION

Upon ignition of the main propellant grain 182, the generated gas pressurizes the gas generator housing 164, and as a result, gas is vented through nozzles 200 in nozzle block 202. Acceleration of the gas by the nozzles 200 effects impingement of the gas upon the blades 198 of the turbine wheel 148. The resulting rotation of the compressor fan 150 draws in ambient air through the screened air inlet 156, such ambient air being drawn in both radially and, longitudinally. The drawn in ambient air is compressed and is guided by internal surface 158 of housing 146 and deflector shield 152 and directed into the inflatable structure through the toroidal duct 160 and sealing valve 162. Entrained in the ambient air directed into the inflatable structure is all of the gas generated by the gas generator assembly 144. Thus, all exhaust products of the gas generator assembly 144 are contained in the inflatable structure.

Changing the relative positions of the gas generator assembly 144 and the compressor fan 150 in the embodiment of FIG. 6, as compared with the relative positions of the gas generator assembly 14 and compressor fan 20 of the invention embodiment of FIGS. 1-5, permits air to enter the compressor fan 150 both radially and longitudinally. This allows the inflatable structure, a portion 159 only of which is shown in FIG. 6, to be packaged around the cylindrical portion of the turbofan/solid propellant gas generator or air induction system 140 embraced by housing 146.

In FIG. 6 reference numerals 214 and 216 indicate attach points for the air induction system 140. Placing the attach points 214 and 216 at positions, as shown, where the system 140 is substantially mechanically balanced, minimizes stress loads on the inflatable structure.

Thus, there has been provided according to the present invention an integral turbofan/solid propellant gas generator air induction system wherein there is coupled in a single device a solid propellant gas generator and a turbofan which is operative, when activated, even after long periods of storage, to take ambient air and compress it to the pressures required for an emergency application such as the inflation of an aircraft slide.

The integral turbofan/solid propellant gas generator in both described embodiments of the invention is characterized in being activated in the same manner as existing inflation systems so as to be directly interchangeable. The solid propellant exhaust gases, in the first embodiment of the invention, after passing through the turbine, are cooled by aspirating air into the exhaust gases. The cooled exhaust gases alternatively may be dumped overboard or entrained in the inflation gas. When the exhaust gases are dumped overboard the inflation gas is primarily ambient air. This assures that the inflation gas will be compatible with the materials used to fabricate the inflatable structure and it also assures that the gases in the inflatable structure are at ambient temperature. Having the gases at ambient temperatures assures that the pressure in the inflatable will not cool down (as with conventional gas generators/aspirator systems) causing depressurization nor warm up (as with conventional high pressure gas/aspirator systems) causing over pressurization.

Containing the exhaust gases in the inflation gas assures minimal human exposure to the exhaust gases and adds to the pressurization of the inflatable structure, and thereby the efficiency of the air induction system. In the second embodiment of the invention all exhaust products are included in the inflatable structure. In this embodiment changing the slide attachment point permits the unit to be balanced, thereby minimizing stress loads on the inflatable structure. Changing the position of the compressor fan permits ambient air to enter the fan both radially and longitudinally and allows packaging of the inflatable structure around the cylindrical portion of the air induction system.

Additionally, while there have been shown and described the novel features of the invention as applied to preferred embodiments, it will be understood that various omissions and substitutions and changes in the form and details of the air induction system illustrated and in its operation may be made by those skilled in the art, without departing from the spirit of the invention. It is the intention, therefore, to be limited only as indicated by the scope of the following claims.

What is claimed is:

1. An integral air induction system comprising,
an air compressor fan,
an outer housing attached to and disposed in surrounding relation to said compressor fan, said outer housing including a duct having a first end positioned to receive an air flow produced by said fan and a second end that is communicable with a structure that is to be pressurized,
a check valve contained within said duct, said check valve permitting air flow out of the second end of said duct but restricting air flow into said duct from said second end,
gas operated driving means for said air compressor fan including a rotatable shaft that is directly connected to said air compressor fan,
a gas generator operably connected to said driving means and,
a mounting member for said gas operated driving means and said gas gnerator, said mounting member being attached to said outer housing and said shaft being carried by said mounting member.

2. An integral air induction system as specified in claim 1 wherein said gas operated driving means comprises a turbine.

3. An integral air induction system as specified in claim 1 with said gas generator including a solid propellant.

4. An integral air induction system as specified in claim 3 including an igniter for said solid propellant.

5. An integral air induction system as specified in claim 4 wherein said igniter is mechanically initiated.

6. An integral air induction system as specified in claim 1 wherein said compressor fan includes an air inlet region and further including a deflector for exhaust gases from said gas operated driving means to deflect said gases away from said air inlet region.

7. An integral air induction system as specified in claim 1 wherein said compressor fan includes an air inlet region and further including a deflector for exhaust gases from said gas operated driving means to deflect said gases toward said inlet region.

8. An integral air induction system as specified in claim 1 wherein said compressor fan is positioned between said gas operated driving means and the first end of said duct.

9. An integral air induction system as specified in claim 8 including a deflector for exhaust gases from said gas operated driving means.

10. An integral air induction system as specified in claim 1 wherein said gas operated driving means is positioned between said compressor fan and the first end of said duct.

11. An integral air induction system as specified in claim 10 wherein said compressor fan includes an air inlet region, said air inlet region allowing both radial and longitudinal air flow to said compressor fan.

12. An integral air induction system as specified in claim 11 wherein said air compressor fan, gas operated driving means, gas generator, and check valve are contained in a cylindrical housing, said duct comprising a portion of said housing, and attach points for the air induction system positioned such that the system is substantially mechanically balanced.

13. An integral air induction system as specified in claim 12 wherein said gas operated driving means comprises a turbine and said gas generator includes a solid propellant and a mechanically initiated igniter for said propellant.

14. An integral air induction system as specified in claim 1 further including static straightening vanes radially disposed with respect to at least said first end of said duct.

15. An integral air induction system as specified in claim 1 further including a fan housing for said air compressor fan,
   said outer housing being attached to and disposed in surrounding relation to said fan housing, and
   said mounting member being attached to said fan housing.

* * * * *